April 24, 1962 J. BUGOSH 3,031,418
CHEMICALLY MODIFIED ALUMINA MONOHYDRATE, DISPERSIONS
THEREOF AND PROCESSES FOR THEIR PREPARATION
Filed Nov. 30, 1959

INVENTOR
JOHN BUGOSH

BY John W. Klooster

ATTORNEY

United States Patent Office 3,031,418
Patented Apr. 24, 1962

3,031,418
CHEMICALLY MODIFIED ALUMINA MONOHYDRATE, DISPERSIONS THEREOF AND PROCESSES FOR THEIR PREPARATION
John Bugosh, Wilmington, Del., assignor to E. I. du Pont de Nemours and Company, Wilmington, Del., a corporation of Delaware
Filed Nov. 30, 1959, Ser. No. 856,154
6 Claims. (Cl. 252—313)

This invention relates to certain novel and very useful chemically modified alumina monohydrate particles, to dispersions containing these particles, and to processes for their preparation.

More particularly, this invention is directed to a chemically modified alumina monohydrate in the form of colloidal anisodiametric particles being characterized by having (a) a specific surface area of 50 to 450 m.²/g. as determined by nitrogen adsorption; (b) an X-ray diffraction pattern having lines at 3.1–2 angstroms, 2.3–2.4 angstroms, 1.8–1.9 angstroms, the strongest line being in the range between 6.2 and 6.7 angstroms; (c) from 3 equivalent percent based on aluminum to X equivalent percent of a polyvalent anion where X is the maximum amount of polyvalent anion that can be chemically incorporated into the alumina monohydrate crystal lattice having the foregoing X-ray diffraction pattern. The invention is also directed to processes for producing such alumina monohydrate.

The invention may be better understood by reference to the attached drawings.

FIGURE 1 is an artist's diagrammatic representation of a growing, pure alumina monohydrate crystal having the boehmite crystal lattice, showing the growth in two dimensions and the characteristic close alignment or packing of the unit cell structures which compose the crystal.

FIGURE 2 is an artist's diagrammatic representation of how a polyvalent anion (here a divalent anion) affects the manner in which the unit cell structures fit together into a crystal lattice in which the polyvalent anion is inserted between the unit structures, thereby in effect distorting the normal spacing between unit cells in the crystal lattice of pure crystalline boehmite, and resulting in the formation of a new type of alumina monohydrate crystal to be further described in FIGURE 5. As shown in FIGURE 2, a monovalent anion may be adsorbed by a unit cell but does not lie between or hold together unit cells and so does not enter the structure.

Figure 1:
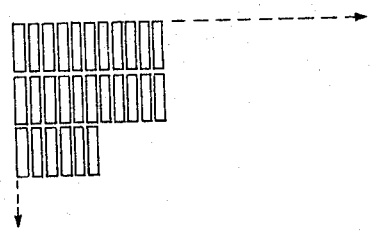
Figure 2:
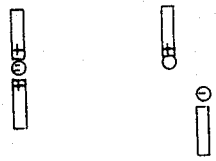
Figure 3:
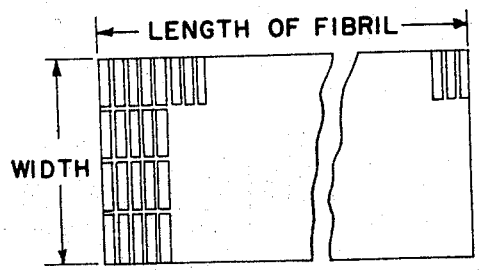
FIGURE 3 is an artist's diagrammatic representation of a pure crystalline boehmite, showing how such a crystal is probably constructed, i.e., of structural units of alumina monohydrate formed into a more or less fibrillar pattern.
Figure 4:
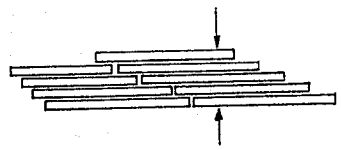
FIGURE 4 is an artist's diagrammatic representation of how a pure boehmite crystal may grow, the arrows indicating the position in which the structural units build (i.e., in the length direction of the pure crystal).
Figure 5:
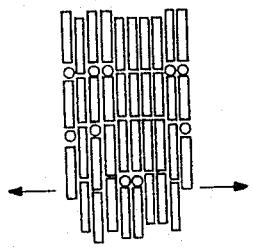

FIGURE 5 is an artist's diagrammatic representation of how the chemically modified alumina monohydrate particles of the invention are possibly formed, the polyvalent anions being introduced into the crystal lattice of a boehmite crystal resulting in what appears to be an extraordinary effect on crystal growth in that growth in the direction of the length of the fiber is retarded and there is even a limitation on all growth due to lattice distortion.

Figure 6:
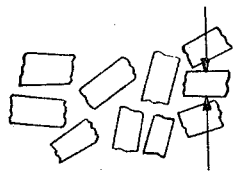

FIGURE 6 is an artist's diagrammatic representation of what happens when the crystal lattice of alumina monohydrate is distorted to such an extent (as by the introduction of too many polyvalent anions into a crystal lattice) that crystal growth is not possible, with the resulting formation of a more or less amorphous highly basic aluminum salt. This tendency of the crystal modifier to distort and interfere with crystal growth tends to make it difficult to characterize the size and shape of the particles in the products of this invention. In general, the crystal size of the modified crystalline alumina monohydrate, when made in the presence of a critical amount of crystal modifier, is smaller than when made under otherwise identical process conditions in the absence of the modifier.

The invention will now be described in detail.

STARTING MATERIALS

In general any alumina starting material described in United States Patent 2,915,475 issued December 1, 1959, to John Bugosh can be used in this invention. Thus, the alumina starting material is such that at least one half can be dissolved at 98° C. in an excess of hydrochloric acid in a time, θ, of less than one minute. By alumina starting material is meant any form of aluminum salt, aluminum oxide or aluminum hydroxide, in crystalline or amorphous form, which will meet the above requirement. Obviously, a soluble aluminum salt such as basic aluminum chloride wil be very satisfactory.

As a preferred source of alumina, I employ basic aluminum acetate which can be characterized by the formula (1) 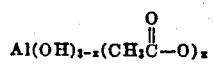

where $x$ is a positive number ranging from 1.8 to 2.2. This material is insoluble in water but soluble in acid, and meets the requirement set forth above. All these starting materials have θ values as θ is defined in above mentioned United States Patent 2,915,475, and thus θ is less than ten minutes.

As can be seen from the above formula, such basic aluminum acetate should have an acetate to aluminum mole ratio ranging from about 1.8:1 to 2.2:1, preferably from 1.9:1 to 2.1:1 and most preferably about 2.0:1.

I prefer that the aluminum acetate be as free of impurities as possible. It is preferred that the contents of metals other than aluminum be below about 5% by weight and most preferably below about 1 weight percent. Anions other than acetate or hydroxide should preferably be kept as low as possible, say below about 5 weight percent. Although certain materials such as organic acid radicals derived from acids weaker than acetic are tolerable in amounts up to about 5 weight percent, strong acid radicals (i.e., stronger than acetic) should preferably be excluded.

The degree to which the basic aluminum acetate starting material is contaminated with inert materials such as silica or alumina is less important than is the case with ionizable salts; however, they will in most cases remain as inert, non-dispersible materials in the finished product and must be kept at low levels if not desired in the products.

I prefer to use a dry basic aluminum acctate (i.e., one containing less than 5 weight percent free water). I also most prefer to use a basic aluminum acetate having ultimate average particle size in the range of 1 to 20 microns as measured by the air-permeability method described by Gooden and Smith in Ind. Eng. Chem. Anal. Ed. 12, 479 (1940), though the particle size or state of subdivision is not critical.

Basic aluminum acetate of these characteristics can be prepared using any conventional procedures. However, a preferred basic aluminum acetate is that prepared according to the teachings of U.S. Patent 2,992,262, issued July 11, 1961.

As a second starting material I use an alumina crystal modifier. These materials, when present in the proper concentrations under suitable process conditions, cause the formation of colloidal particles of alumina monohydrate containing the modifier in chemically combined form. Such alumina modifiers are in the nature of water soluble salts derived from univalent and divalent basic materials (i.e., univalent and divalent bases) and polyvalent acidic substances (i.e., polyvalent acids). Trivalent and higher polyvalent cations are less desirable because they tend to contaminate the product. By the term "water soluble," I mean that such salt dissolves completely under process conditions. By the term "polyvalent" I mean divalent, trivalent, tetravalent and pentavalent. In other words, the boehmite modifiers are water soluble salts having polyvalent anions.

The chemical and physical characteristics of such alumina modifiers are not, in general, critical. I prefer that they dissociate in aqueous solution to an extent of at least 0.1 weight percent of the total quantity of modifier(s) added. The cations and anions can be organic or inorganic.

Examples of inorganic polyvalent anions include sulfate, sulfite, molybdate, carbonate, phosphate, phosphite, chromate, dichromate, vanadate, fluoroaluminate, arsenate, borate, ferrocyanide, ferricyanide, thiosulfate, dithionate, and the like.

Examples of organic polyvalent anions include those of dicarboxylic acids and the like, such as oxalate, maleate, succinate, glutarate, adipate, and the like; those of tricarboxylic acids such as 2-hydroxy-1,2,3-propanetricarboxylic acid, citrate, and the like; those of tetracarboxylic acids; and those polyfunctional carboxylic acids such as citrate, tartrate, fumarate, acetonedicarboxylate, and the like. Organic polyvalent anions having molecular weights below about, say, 600 appear to work most satisfactorily in this invention.

Examples of inorganic monovalent (univalent) cations include lithium, sodium, potassium, ammonium, and the like.

Examples of inorganic divalent cations include calcium, magnesium, cuprous, stannous, nickel, and the like.

In general, choice of univalent or divalent anion seems to be simply a matter of preference or availabilty of starting materials.

The crystal modifiers' anions are prone to combine with aluminum and to be strongly adsorbed upon alumina, as shown by chromatographic studies. I do not know that this has anything to do with the mechanism by which they act in this invention but suggest that these anions profoundly modify the behavior of alumina and aluminum.

A preferred anion is sulfate. Sulfate can be added in the form of its water-soluble salts, such as sodium, potassium, ammonium, or quaternary ammonium salts.

Sulfate, molybdate, and chromate and other stable inorganic anions (that is stable under the autoclavic conditions of the process) appear to give some shortening of the particles when used in quantities as little as 3 equivalents of sulfate ion per 100 gram-atoms of aluminum in the alumina monohydrate.

It appears to be desirable with the carbonate, sulfite, and other less stable ions to add somewhat larger quantities of anhydrides, such as carbon dioxide or sulfur dioxide in order to obtain the indicated required concentrations of the carbonate or sulfite ion.

Vanadate is added in the same fashion and in about the same amounts as the molybdate and chromate. Fluoroaluminate need not be added as fluoroaluminate per se but can be added as hydrofluoric acid or even sodium fluoride to produce it in situ.

The borate should be used in larger amounts because the boracic acid is a very weak acid. Thus larger amounts are required, say, up to 10 to 20 equivalents, are desirable.

The carboxylic acids when used are preferably those in which the carboxylic acid groups are sufficiently close together so that both can coordinate with the same area of surface on a particle. Thus it is preferred to use relatively low molecular weight organic acids and not those which have so many hydrocarbon moieties as to reduce their solubility in water. Thus there can be used preferably succinic acid, glutaric acid, maleic acid, orthophthalic acid, mucic dihydroxy maleic acid, ethylenediaminetetraacetic acid, thiodipropionic acid, diglycolic acid, tartaric acid, citric acids, etc.

The water used as a starting material for the invention need have no special characteristics or purity. I have found ordinary tap water, distilled water, and water demineralized with ion-exchange resins all to be equivalent.

PROCESS CONDITIONS

In general, the products of this invention are produced by employing the same process conditions and process variables described in Bugosh U.S. Patent 2,915,475. Thus, an aqueous, acidic dispersion of alumina is heated until the colloidal products of the present invention are formed.

First, to an aqueous acidic suspension of alumina is added from about 3 to 30 equivalent percent, based on aluminum, of at least one crystal modifier, as described herein.

Thereafter, the resulting mixture is heated under certain conditions until the resulting alumina monohydrate particles are formed. These conditions may be summarized as follows:

(a) The alumina starting material is such that one-half can be dissolved at 98° C., in an excess of hydrochloric acid in a time, $\theta$, of less than ten minutes.
(b) The system contains a monobasic acid radical having a dissociation constant greater than 0.1 at 25° C.
(c) The $Al_2O_3$ content of the system is from 0.05 to 1.5 molar.
(d) The acid radical concentration is no less than 0.05 molar and does not exceed 4.2 molar.
(e) The said temperature of heating is 120 to 250° C.

As mentioned, the process conditions and process variables which principally affect the character of these products obtained are the same as those described in Patent 2,915,475 and are:

(1) Acids used,
(2) Concentration of $Al_2O_3$,
(3) Concentration of acid,
(4) Ratio of $Al_2O_3$ to acid,
(5) Operating temperature, and
(6) Temperature-time relation.

These process conditions are described in detail in said Patent 2,915,475 and are incorporated by reference into the present application from the description there given.

The products obtained from the heating step just described are generally in the form of mixtures of the alumina monohydrate particles and water.

After the autoclaving step, the aqueous reaction mixture is cooled and may be further treated in various ways, if desired, to make purified sols or dispersions, dried powders and the like. The colloidal alumina removed from the autoclave will usually be present as a gelatinous mass, a flocculent precipitate or, in case of dilute reaction mixtures, as a fluid sol. These products may be dried directly by any conventional method, to remove water and volatile acids. The drying may be carried out in any conventional equipment such as a drum-dryer, drying pans, freeze-dryer or other apparatus where the product is not subjected to temperatures over the decomposition point of the product. Thus, where an organic crystal modifier is used, it will be noted that drying should not be carried out under conditions where the dry product will reach a temperature of over 100 or 125° C. In some cases, drying under vacuum at 50° C. or 60° C. is beneficial. The type of drying depends on whether one wishes to obtain a powder which will swell or disperse in water to form sols, or whether one wishes to convert the alumina monohydrate to a coherent molded adsorbent body, for example, or even to a pelleted catalyst of gamma alumina. It will be obvious to one skilled in the art that such dehydrated forms of alumina may be made directly from the autoclave reaction-mixture by heating rapidly, as in a flame or spray dryer operating at high temperature.

The reaction mixture may be purified in various ways as by ion-exchange, to remove excess of the crystal modifier agent, where this is not all combined in the alumina monohydrate crystals, and to remove the acid liberated in the process from the anion of the basic aluminum salt employed. Purification may involve flocculation or precipitation of the colloidal alumina monohydrate from suspensions or sols, by raising the pH to 8 with ammonia, filtering and washing. Dialysis may be employed to remove all soluble ions from the colloid product.

The free water in the colloidal products suspensions or sols may be replaced with polar solvents such as alcohols, glycols, ketones and the like. This may be done by methods further described in U.S. Patent 2,915,475. The types of solvents and fluids that may be employed are also therein described. The dried colloidal alumina monohydrate of this invention may be in the form of a powder, compacted into pellets or other shaped objects. For products that are to be dispersed in water or organic media, finely pulverized powder is preferred to permit rapid dissolution and formation of sol. For products that are non-dispersible in water, as when relatively high amounts of crystal modifier are in the product, the drying conditions are not so critical. Such products may be compacted directly to pellets of catalysts, for example.

In making up aquasols from dispersible powder products of this invention, the powder is stirred in water, preferably with violent agitation. Dispersion may be assisted by adding to the water about 5 to 10% by weight of a monobasic acid, based on weight of dry powder, using acids such as hydrochloric, nitric or acetic.

In the absence of such acids, the pH of 1% aqueous sols made from the dispersible powders of this invention will have a pH in the range from 3 to 5.5, usually about 3.5 to 4.5.

As a preferred method of drying the colloidal chemically modified alumina monohydrate produced in the autoclave, along with accompanying free water and acid is spray dried with air temperature regulated to keep the dried particles from being heated over 100° C. Another preferred method is to feed the wet reaction mixture to a rotary drum dryer with a surface at 130° C., heated by steam. The drying time is about one minute and the product is scraped from the drum as soon as dry.

All of the colloidal alumina particles produced by the processes of this invention when dried, according to the above preferred drying procedures, have the physical and chemical characteristics described below. In some cases the drum dried material is obtained in the form of flakes which may then be micropulverized. Air drying may be employed, but is slow.

PRODUCTS

The solid products of this invention are in the form of colloidal anisodiametric particles.

The surface area of the particles ranges from about 50 to 450 square meters per gram (m.$^2$/g.), as measured by nitrogen adsorption. Preferably, the particles' surface area ranges from 200 to 350 m.$^2$/g.

Surface area is determined by the procedures given in U.S. Patent 2,915,475.

The solid products of this invention are characterized by having X-ray diffraction lines corresponding to lattice spacings in the regions (angstrom units) 3.1–3.2, 2.3–2.4, 1.8–1.9, 1.43–1.45, and 1.30–1.32, with the strongest line being in the region 6.2 to 7.0 angstroms. In most cases, the spacings are, more precisely, about 3.16, 2.35, 1.85, 1.44, 1.31 and the spacing corresponding to the strongest line, which is between 6.2 and 7.0, depends on the nature and amount of crystal modifier present. Another characteristic is that the strongest line which corresponds to the spacing of between 6.2 and 7.0 angstroms, is not usually more than twice the intensity of the line corresponding to 3.16 angstroms. Another characteristic is that, unlike pure crystalline boehmite, the product of this invention has no characteristic line corresponding to a spacing of about 1.53 angstroms; if a weak line appears in certain samples, it is insignificant and has an intensity of less than 5% that of the strongest line in the region 6.2–7.0 angstroms.

Chemically bound into the crystal structure, I have found there to be polyvalent anions. These anions are introduced from the above-described crystal modifiers during the above-described processing, into the particles as they are formed. While I do not want to be in any way bound by my theory and while I do not understand fully the mechanism involved in this occurrence, I theorize that when, under the above-described processing conditions, the basic aluminum salt starting composition is hydrolyzed in the presence of at least 3.0 equivalents of polyvalent anions per 100 gram atoms of aluminum, then the natural or normal crystal development of pure crystalline boehmite cannot take pace.

The products of this invention are particularly useful presumably because of the unusual size and shape of the colloidal particles, which seems to result from the change brought about on the crystal structure by the crystal modifiers. The size and shape of the colloidal particles in many of the products of this invention are very hard to define. Ordinarily the size and shape of alumina particles is easily determined by the electron microscope. But in the products of this invention, whether because of fuzzy edges of the particles, unusual thinness, or partially aggregated condition, the size and shape are very difficult to determine in any quantitative manner. The particles most usually are anisodiametric, that is, they do not have equal diameters or dimensions. Usually, they do not have cubic, spherical, or similar compact shape, but are apparently sheet-like or ribbon-like, as far as can now be determined. They may be platelets of irregular shape. Often they appear to be fuzzy, irregular, small masses of colloidal size in every dimension. Under process conditions of higher temperature and pressures, the particles formed are more clearly defined and may be thin platelets, rectangular shaped, or in the form of elongated hexagons.

Products of this invention are especially useful because they can be compacted under pressure, or molded to coherent bodies which can be fired at white heat to give strong ceramics. They can also be concentrated to viscous yet pourable aquasols which are less viscous or more plastic, in the case of very high concentrations, than highly elongated fibrous colloids. Nevertheless, because of their state of subdivision, sometimes their anisodiametric shape, they form coherent bodies when the particles are brought into close contact.

The products of this invention are especially valuable in certain applications because of their extremely small particle size, and positive ionic charge on the particles in aqueous dispersions. They are especially valuable for treating paper and textiles, since many of the particles of this invention are almost as small as some organic dye molecules and can penetrate textile fiber structures and adhere tenaciously to the fiber surfaces. Especially textiles and also paper products treated with sols of this invention, and dried, show improved resistance to soiling, are less inclined to pick up static charges and are more receptive to acid dyes.

There seems to be a unit structure for a crystalline alumina monohydrate. A normal growth pattern for an alumina monohydrate crystal involves a close and orderly alignment of such unit structures. These unit structures lead to a repeating distance of approximately 6.1 angstroms and normally there is very little or no space between the units.

However, when sufficient alumina crystal modifier is present at the time of crystal growth, the unit structures are no longer spaced so closely, and thus at least some of the atomic spacings are different from those in pure crystalline boehmite. The alumina modifier in proper concentration causes the average spacing between unit structures to increase from 6.15 angstroms to from at least 6.2 to, say, 7.0 angstroms. The result is a new and different synthetic crystalline colloid containing the unit structures of alumina monohydrate.

The amount of crystal modifier employed in this invention ranges from 3.0 to in general about 30 equivalent-percent of modifier polyvalent anion, based on aluminum in the system. By this is meant from 3 to about 30 gram-equivalents of anion per 100 gram-atoms of aluminum in the alumina monohydrate. For example, a gram-equivalent of sulfate ion is 48 grams. Thus, 3 gram-equivalents of sulfate ion would be 144 grams of sulfate ion per 100 gram-atoms of aluminum or 2697 grams of aluminum which corresponds to 5100 grams of alumina. Also, it will be noted that a gram-equivalent of a trivalent anion will correspond to one third the molecular weight of the anion. Similarly, an equivalent of a pentavalent anion is one fifth of a molecular weight of that anion.

The exact upper limit of the amount of anion modifier which can be incorporated into the crystal lattice depends upon the nature of the anion employed and to some extent the processing conditions. If too much modifier is employed, for example too much sulfate, then above a certain level the alumina monohydrate will not be formed, or if formed, may be further converted to a basic aluminum sulfate, for example. The amount of modifier will be generally kept to a minimum required to bring about desirable changes in the structure and form of the alumina monohydrate particles.

Some modifiers, when incorporated into the reaction mixture of the process of the invention, are completely bound into the alumina monohydrate crystals, and essentially none of the modifier remains in solution after completion of the process. In such cases the amount of modifier added in the process, based on aluminum, will be the same as that in the final product. On the other hand, certain modifiers which are very weakly ionized, such as boric acid, are present in the reaction mixture largely in nonionic form, and only a very small portion of the total added modifier is chemically bound in the structure product. In this case it is generally preferred to separate the unchanged modifier from the colloidal alumina by procedures such as precipitation, ion exchange, dialysis, or the like. It is possible to determine when too much modifier has been employed by examining the product by X-ray diffraction. If the product made with the larger quantity of modifier exhibits a set of X-ray diffraction lines not found in the product when a smaller quantity of modifier is used, then it may be suspected that the modifier has reacted with alumina monohydrate, forming another solid phase of a basic salt of aluminum. Products containing basic aluminum salts of the modifier, wherein may be found, for example, one equivalent of modifier per aluminum atom, are not desirable. Such impurities formed by the employment of too much modifier may also be detected by comparing electron micrographs of the products with those of products made with less modifier. The basic aluminum salts often appear as more coarsely crystalline particles in admixture with the very finely divided, colloidal alumina monohydrate.

The chemically modified alumina monohydrate particles as formed in solution will be accompanied by monovalent anions which are employed in the process of the invention as explained. When the starting material is an aluminum basic diacetate, the particles are found to be associated with acetic acid in chemically bound form when the water and excess acetic acid have been removed from the product by drying the aqueous dispersion obtained from the heating step. This chemically bound acetate is believed to be in the form of acetate ions held to the surface by chemical linkages, and they are not removed, for example, under vacuum at 50° C. Depending upon the concentration of the solution from which the particles are recovered and the amount of water evaporated therefrom, the bound acetate content of the dried product will vary from as low as one acetate group per square millimicron of surface area to as high as four groups. Generally, about three groups will be found, and there is some question as to whether acetate in excess of this amount is really chemically bound or whether it is strongly physically adsorbed. The specific surface of the product, whether in the sol form, dispersion, or as a dry powder, may be determined by the adsorption of nitrogen at low temperature, a method which is well known in the art. Precautions and detailed instructions for the application of this method to the products of the present invention are the same as those described in U.S. Patent 2,915,475.

The dry powders of this invention may contain some adsorbed water in addition to the water chemically bound in the crystal lattice of the alumina monohydrate. As much as 20% by weight or more of adsorbed or physically held water may be present in a powder without making it particularly sticky or paste-like. It is generally preferred, however, that water which is readily removed by drying in air be removed before storing the product. However, it is not desirable to dry the powder under too drastic conditions since it is preferred to leave a few percent of water, such as 3 to 6 percent by weight, physically absorbed in the product. This can be determined, for example, by conventional methods such as measuring the amount of water evolved, by drying the sample in a stream of dry air at 100° C., or by titrating the free water by the Fisher reagent.

The invention is further illustrated by the following examples:

*Example 1*

The following example typifies the preparation of the colloidal alumina of this invention containing sulfate ion as the additive, to modify the particle size and crystal structure: 4.29 parts by weight of basic aluminum diacetate, anhydrous, containing 31% by weight of $Al_2O_3$, was suspended in 21.73 parts by weight of water, and to this suspension there was added, with stirring, 3.98 parts by weight of a 0.1 molar solution of sodium sulfate, which corresponds to 1.5 moles of sodium sulfate per 100 gram atoms of aluminum in the system, or 3.0 equivalents of sulfate ion per 100 gram atoms of aluminum. This mixture was placed in a glass-lined rocker autoclave and heated to a temperature of 160° C. for 30 minutes. When cooled, the product was a white, opaque, suspension from which a white precipitate had settled upon standing. A portion of this product was agitated with a slight excess of barium acetate over that required to convert the sulfate in the product to barium sulfate. There was thus obtained a very fluid, although cloudy sol from which barium sulfate settled on standing. This sol was very fluid, as compared with a sol of colloidal alumina prepared in exactly the same way, except that 3.98 parts by weight of water instead of the 0.1 molar sodium sulfate solution was employed. When this sol is spray dried in the range of 60 to 130° C., a dry free-flowing powder is produced.

*Example 2*

In this example, glyceryl phosphate was employed to liberate the phosphate ion homogeneously in the reaction mixture during autoclaving. The procedure was carried out exactly as in the previous example, except that instead of sodium sulfate there was added 3.98 parts by weight of 0.1 molar solution of sodium glycerol phosphate. Because phosphoric acid is tribasic, this mixture corresponded to 4.5 equivalents of phosphate ion per 100 gram atoms of aluminum. After autoclaving, the product was a very clear gel which, however, showed no birefringence. It is believed that the gelatinuous character is due to the crosslinking effect of the excess phosphate ions. When diluted with an equal volume of water, to reduce phosphate ion concentration, there was obtained a viscous sol which, when cast on glass, gave a clear, adherent film. Examination of the sol showed that it contained short rods in aggregates which made it difficult to determine particle size and had a characteristic X-ray diffraction pattern in which the line at 6.2 angstroms was only 1.8 times as strong as the line at 3.16 angsroms, and the usual line in ordinary boehmite at 1.53 angstroms is missing. The phosphate ion was in chemical combination with the colloidal alumina, since it was not removed by dialyzing the sol against distilled water. When this product is spray dried in the range from 60 to 130° C., a dry free-flowing powder is produced.

*Example 3*

The following is an example of the preparation of a product of this invention modified with malate ion. This preparation was carried out exactly as in the foregoing example, except that 3.98 parts by weight of 0.1 molar solution of ammonium malate was added as a modifying agent. After autoclaving, the sol was a milky fluid containing a slight amount of precipitate. The sol is dried according to Example 2 drying procedures. It showed no streaming birefringence. An electron micrograph showed the colloidal alumina to be in the form of short, fuzzy ribbons or short rods which were so small and indistinct as to be difficult to characterize the individual particles. The X-ray diffraction pattern showed that the line at 6.2 angstroms was 2.5 times as intense as the line at 6.1 angstroms, and there was no line at 1.53 angstroms.

Careful examination of this product made in the presence of malic acid showed that the line which is nominally at 6.2 angstroms had its peak at 6.28 angstroms, and is thus shifted to a somewhat longer spacing than found in well crystallized boehmite.

*Example 4*

The following is an example of a colloidal alumina of this invention modified with mucic acid, which has the formula HOOC·(CHOH)$_4$COOH. The preparation was carried out exactly as in the foregoing examples, except that 3.98 parts by weight of a 0.1 molar solution of mucic acid was employed, thus giving 3 equivalents of mucic acid per 100 gram atoms of aluminum. After autoclaving, the sol was milky fluid containing some white precipitate, and showing no streaming birefringence. The sol was dialyzed against distilled water, but continued to be milky and opaque. A sample was dried at room temperature to give a white granular material which repeptized in water to a milky sol.

The electron micrograph showed that the colloidal alumina consisted of extremely thin ribbons or plates, although the size and shape were difficult to describe because of the tendency of the ribbons to overlap and curl up. The X-ray pattern differed from that of boehmite in that the line at 6.2 angstroms had an intensity of 1.33 times the intensity of the line at 3.16, and there was no line at 1.53 angstroms.

Examination of the X-ray line which appeared in the region of 6.2 angstroms showed that the peak intensity occurred at 6.46 angstroms, showing that the line was definitely shifted from the usual position for pure boehmite.

In order to show that a monovalent anion is not a modifier, a parallel experiment was made, using gluconic acid instead of mucic acid. Gluconic acid has the same structure as mucic acid, except that one of the carboxyl groups of mucic acid is reduced to an alcohol group. Gluconic acid has the structure HOCH$_2$(CHOH)$_4$COOH. The product from the autoclave made in the presence of gluconic acid was a clear gel which showed strong streaming birefringence, indicating the presence of fibrous boehmite. An electron micrograph showed the presence of fibrils over 100 millimicrons long and less than 10 millimicrons in diameter. An X-ray diffraction pattern made from a sample of the dried sol showed the pattern of boehmite in which the strongest line was in its normal position at 6.19 angstroms, and this line was 24.0 times as strong as the line at 3.16 angstroms. Also, there was a line at 1.53 angstroms which was 75 percent as strong as the line at 3.16 angstroms. It is thus seen that even in the case of two organic acids having such similar structures as mucic acid and gluconic acid, only the dibasic acid, which forms divalent anions, was effective in modifying the structure of the colloidal alumina, and yielding low viscosity fluid sols which are more fluid than colloidal aluminas of the same concentration made in the absence of the divalent anions.

*Example 5*

Following the materials and methods described above, a colloidal alumina was made modified with 2.65 parts by weight of a 0.1 molar solution of ammonium maleate, along with 4.29 parts by weight of basic aluminum diacetate in 23.06 parts by weight of water. This provided 2 equivalents of maleate ion per 100 gram atoms of aluminum in the system. After autoclaving in the manner described above, for 30 minutes at 150° C., the product gave a sol containing short stubby rods of colloidal alumina, which, as far as could be judged from the electron micrographs, were aggregated into parallel clusters up to 50 millimicrons wide and 100 millimicrons long. The maleate ion was chemically bound into the colloidal alumina, and was not removable by dialysis. The product is dried according to Example 1 drying procedures.

*Example 6*

Colloidal alumina was prepared as in the preceding example, using 3.0 equivalents of phosphate ion per 100 gram atoms of aluminum, added in the form of 2.6 parts by weight of a 0.1 molar ammonium phosphate solution. After autoclaving, the sol closely resembled that described above, made with maleate ion.

*Example 7*

The following is an example of a colloidal alumina made in the presence of 10 mole percent of tartrate ion based on aluminum. 14.5 parts by weight of anhydrous aluminum diacetate in the form of crystals about 20 microns in diameter was slurried in 50 parts by weight of water and sufficient diammonium tartrate added to give 1 mole percent of tartrate ion based on aluminum, then the mixture was diluted to a total of 100 parts by weight and autoclaved in a glass-lined pressure vessel for 30 minutes at 160° C., with slow agitation. Upon cooling, there was obtained a white opaque sol, which dialyzed against distilled water at 90° C., until the pH of the sol was about 5.0. A sample dried at 110° C. gave a residue which was a white powder that redispersed to an alumina sol when stirred with water. The dried solid contained 76.7 percent Al$_2$O$_3$, 2.0 percent carbon, 2.24 percent hydrogen, and had a specific surface area of 329 m.$^2$/g. One of the carboxyl groups of the tartrate ion is probably combined with the surface of the aluminum in the form of a —C—O—Al— linkage. The tartaric acid in this product may be considered as a half anhydride. From the carbon content, the tartaric half anhydride can be calculated, and its equivalent content of hydrogen estimated. This hydrogen is then subtracted from the total hydrogen, to give the remaining hydrogen which is in the sample in the form of adsorbed or chemically combined water. These calculations show that the product has the composition $Al_2O_3$—76.7%, tartaric acid half anhydride—6.0%, water—17.8%, total—100.5%.

It will be noted that when an excess of modifying agent such as tartaric acid is employed, only part of it remains chemically bound in the product. When as little as about 3 equivalent percent of divalent anion modifying agent is employed, all of it remains chemically bound in the product, but when more than about 5 equivalent percent of divalent anion, based on aluminum, is used, then some or all of the remaining divalent anion is removable from the product, for example by dialysis.

An electron micrograph of this sol made in the presence of 10 mole percent of tartaric acid based on aluminum atoms showed that it consisted of extremely fine, indefinitely shaped particles in the form of irregular clusters. These particles appear to be less than 10 millimicrons in diameter, and probably of the order of 5 millimicrons in diameter, but they were sufficiently aggregated that it was difficult to estimate the size quantitatively. A sample of the alumimna sol dried at 110° C. was examined by X-ray diffraction and found to have the strongest line at 6.7 angstroms, instead of the usual 6.1 to 6.2 angstroms found for conventional boehmites. However, except for the line at 1.53 angstroms, all of the other strong lines of boehmite were present. The line at 6.7 angstroms was 1.8 times as strong as the line at 3.18 angstroms which was used as the basis of comparison. From the breadth of the lines at 3.18 and 2.35 angstroms, measured at half the height, the particle diameter of the alumina was estimated to be about 3.5 millimicrons.

*Example 8*

A 0.2 molar solution of basic aluminum chloride containing 2 aluminum atoms per chloride ion is mixed with urea, which in the subsequent heating step in the process was converted to carbonate ion. Three ratios were employed, namely, Al/urea molar ratio of 4/3, 6/3, 12/3. The pH's after autoclaving the mixture for 16 hours at 160° C. in a Pyrex container had increased from about 4.5 to 8.6, 8.0, and 5.6, respectively. After autoclaving, the solutions contained transparent lumps of gel, but the mixture was stirred violently at sufficient temperature to evaporate water and ammonia, and the gelatinous material was dispersed to yield a viscous sol. Electron micrographs showed in all cases that the colloidal alumina consisted of very small platelets from 10 to 30 millimicrons wide, and 50 to 150 millimicrons long. At lower ratios of urea, as in an Al/urea ratio of 12/3, the particles were elongated into ribbons.

The ratio of urea to alumina, or vice versa, did not appear to be particularly critical, probably because above a certain minimum concentration of carbonate ion, increasing the amount of $CO_2$ in the system probably does not increase the carbonate ion concentration proportionately. Thus, a ribbon-like platelet was obtained when 3 moles of urea were used per 4 atoms of aluminum, and a similar product obtained with 3 moles of urea for 30 atoms of aluminum. The dimensions of the platelets range from 60 to 250 millimicrons long, 10 to 60 millimicrons wide, and 5 to 15 millimicrons in thickness, as observed in the electron micrograph, where some of the platelets appeared to be turned on edge.

*Example 9*

Small indistinct particles of colloidal alumina, 25 to 50 millimicrons in diameter, are obtained when a basic aluminum chloride solution is autoclaved in the presence of a small proportion of ammonium vanadate, the vanadate ion $VO_4^{-3}$ being the polyvalent ion modifier. The colloidal alumina contains the vanadate ion in chemical combination. In making this product, a 0.6 molar solution of basic aluminum chloride, in which the atomic ratio of aluminum to chlorine is 2:1, was first mixed with ammonium vanadate, $NH_4VO_3$ which, in water, hydrolyzes to form vanadate ions, $VO_4^{-3}$. Thus, ammonium metavanadate furnishes the polyvalent vanadate ion. The vanadate was employed in an amount to give 1 vanadate ion per 60 atoms of aluminum. The solution was heated in a Pyrex glass container in an autoclave for 16 hours at 160° C., and produced a greenish, turbid, extremely viscous sol. An electron micrograph showed that the particles were strikingly different from those obtained under identical conditions in the absence of this small amount of vanadate, since in the absence of vanadate, highly fibrous material was produced under these identical conditions. The vanadate did not prevent the alumina from polymerizing since the unpolymerized alumina in the products all was about 19 percent of the total alumina, which was identical with that found when a similar basic aluminum chloride solution was autoclaved under these conditions in the absence of vanadate to form fibrous boehmite. The electron micrograph showed small colloidal particles, as indicated at the outset.

*Example 10*

Very small platelets of colloidal alumina are produced by autoclaving a dilute solution of basic aluminum acetate containing boric acid. To a tared beaker 28.7 grams of a commercial water soluble basic aluminum acetate powder was dissolved in 300 grams of distilled water giving a solution having a pH of 5.1. This was autoclaved for 4 hours at 180° C. The basic aluminum acetate powder employed had an analysis corresponding to 35% by weight of $Al_2O_3$, 44.4% by weight of acetic acid, and 11.64% of boric acid. This analysis corresponds to one acetate ion per aluminum atom, and about one boric acid molecule per 3 aluminum atoms. The sol obtained did not show any streaming birefringence, and when examined by the electron microscope was found to consist of extremely small particles, which was suspected as soon as the sol was prepared because of its transparent nature. These particles, as well as could be determined by the electron microscope, appeared to be either spheres or extremely short, stubby rods, so short as to perhaps approach the cubic form, and the particle diameter was of the order of about 20 millimicrons.

In this instance, a relatively high concentration of boric acid is required, because only a small portion of it at any one instant is ionized to yield polyvalent borate ions. Because only a small portion of the boric acid is in the solution in the ionic state, only a minor proportion is chemically bound into the colloidal alumina structure, yet this minor amount is all that is required to profoundly modify the nature of the alumina particles which, in the absence of the boric acid, would be highly fibrillar.

*Example 11*

The influence of the molybdate ion in directing the polymerization of alumina in basic aluminum acetate solution is shown as follows: A commercial, water insoluble basic aluminum acetate containing one aluminum atom per two acetate ions, namely, basic aluminum diacetate, was suspended in sufficient water to give an equivalent concentration of alumina of 3.0 percent by weight $Al_2O_3$. The pH of this suspension was 5.0. After autoclaving in a Pyrex container for 4 hours at 180° C. and cooling, the pH of the resulting sol was 3.3, and the sol consisted of short, but definite fibers. In this instance, the amount of molybdate was insufficient to give non-fibrous boehmite, and there was present 1.14 equivalents of molybdate ions per 100 aluminum atoms.

On the other hand, when the molybdate ion concentration was increased by adding more ammonium molybdate to the system to give 3 equivalents of molybdate ions per 100 aluminum atoms, and hydrolyzing the diacetate under identical conditions, a sol was formed which contained indefinite particles which may have consisted of extremely small platelets or cubes of about 15 or 20 millimicrons diameter. The colloidal alumina contained bound molybdate ions, as evidenced by the fact that molybdate ions were present in the sol even after prolonged dialysis against distilled water.

*Example 12*

Colloidal alumina modified with molybdate ions in the form of platelets or planar aggregates of isodiametric particles was produced under conditions identical with those in the above example, except that more ammonium molybdate was added so as to have present 8 equivalents of molybdate ion per 100 aluminum atoms. The product is dried according to Example 1 drying procedures.

I claim:

1. A chemically modified alumina monohydrate in the form of colloidal anisodiametric particles being characterized by having (a) a specific surface area of 50 to 450 m.$^2$/g. as determined by nitrogen adsorption; (b) an X-ray diffraction pattern having lines at 3.1–3.2 angstroms, 2.3–2.4 angstroms, 1.8–1.9 angstroms, the strongest line being in the range between 6.2 and 6.7 angstroms; (c) from 3 equivalent percent based on aluminum to X equivalent percent of a polyvalent anion where X is the maximum amount of polyvalent anion that can be chemically incorporated into the alumina monohydrate crystal lattice having the foregoing X-ray diffraction pattern.

2. A chemically modified alumina monohydrate in the form of colloidal anisodiametric particles being characterized by having (a) a specific surface area of 50 to 450 m.$^2$/g. as determined by nitrogen adsorption; (b) an X-ray diffraction pattern having lines at 3.1–3.2 angstroms, 2.3–2.4 angstroms, 1.8–1.9 angstroms, the strongest line being in the range between 6.2 and 6.7 angstroms, the line at 6.2–6.7 angstroms having no more than twice the intensity of the line at 3.16 angstroms, and a line at 1.53 angstroms, if present less than 5 percent as intense as the line at 3.16 angstroms; (c) from 3 equivalent percent based on aluminum to X equivalent percent of a polyvalent anion where X is the maximum amount of polyvalent anion that can be chemically incorporated into the alumina monohydrate crystal lattice having the foregoing X-ray diffraction pattern.

3. The product of claim 1 containing less than 20 weight percent free water having particle surfaces coated with nonvolatile acetic acid chemically bound to particle surfaces in amounts from about 1 to 4 acetate groups per square millimicron of surface area.

4. The product of claim 1 in which the polyvalent anion is an organic anion having a molecular weight below about 600.

5. A dispersion of the particles of claim 1 in water.

6. In a process for making a colloidal chemically modified alumina monohydrate, the steps of (1) mixing from 3 to 30 equivalent percent, based on aluminum, of a polyvalent anion with an aqueous acidic suspension of alumina and then (2) heating under the following conditions the resulting mixture until the alumina monohydrate particles are formed:

(a) The alumina starting material is such that one half can be dissolved at 98° C., in an excess of hydrochloric acid in a time, $\theta$, of less than one minute, (b) The system contains a monobasic acid radical having a dissociation constant greater than 0.1 at 25° C., (c) The Al$_2$O$_3$ content of the system is from 0.05 to 1.5 molar, (d) The acid radical concentration is no less than 0.05 molar and does not exceed 4.2 molar, (e) The said temperature of heating is 120 to 250° C.

References Cited in the file of this patent

UNITED STATES PATENTS

| | | |
|---|---|---|
| 2,733,205 | Dalton et al. | Jan. 31, 1956 |
| 2,915,475 | Bugosh | Dec. 1, 1959 |